INVENTOR.
CARL W. HANSEN
BY
ATTORNEYS

United States Patent Office 3,235,732
Patented Feb. 15, 1966

3,235,732
RADIATION THICKNESS GAUGE INCLUDING A FEEDBACK READOUT CIRCUIT
Carl W. Hansen, Wayland, Mass., assignor to Laboratory for Electronics, Inc., Boston, Mass., a corporation of Delaware
Filed July 11, 1962, Ser. No. 209,189
2 Claims. (Cl. 250—83.3)

The present invention relates in general to radiation gauges, and more particularly to a radiation gauge including a compensation circuit for decay of the radioactive source.

The use of radiation gauges as transducers in industrial process measurement is now well known. The radiation gauge measures some critical physical variable in the industrial process and generates an output signal indicative of the value of this variable. Most frequently, such gauges are employed as part of an automatic control system including in a closed loop both the radiation gauge and the production plant itself. The remaining elements in such a control loop are a comparator, which compares the value of the variable as measured by the radiation gauge to a predetermined optimum value of the variable; a controller which converts the output of the comparator into a correction signal; and a control element which acts in response to the correction signal on the plant itself to return the controlled process to the predetermined optimum value.

The radiation gauge itself includes a radioactive source and a radiation detector. In a typical example, such a gauge may be used to measure the thickness of a continuous web of processed material such as paper. The radioactive source in this instance may be formed from a beta emitting radioisotope. The radioactive source is placed on one side of the web of material and the detector on the opposite side. The radiation received by the detector is then related to the thickness of the material such that an increase in the thickness of the paper web results in a decrease in radiation received by the detector. One preferred form of radiation detector is an ionization chamber, which provides as an output a small current at a relatively high impedance. In the usual measuring technique, this small current is flowed through a high impedance to generate a signal voltage. A bridge network is used to develop an opposing voltage to the signal voltage, and the series combination of the signal voltage and opposing voltage are applied to the input of a suitable amplifier, the output of which drives a servo mechanical motor. The servo mechanical motor in turn is used to control the value of a variable impedance in the opposing voltage bridge circuit. This system then provides a null balancing system, in which the position of the servo mechanical motor shaft or the value of the variable impedance provides the output indication of the value of the ionization chamber signal.

One of the problems inherent in radiation gauges is that of decay of the radioactive source. Radioactive materials decay with time at a predetermined rate. As they decay, the amount of radioactive particles which they emit in a given time decreases. Accordingly, a radiation gauge which has been initially calibrated so that a specific current from the ionization chamber is representative of a specific thickness of material which has been gauged loses this calibration when the radioactive source has decayed significantly. Thus, periodic recalibration is required to compensate for this radioactive decay. The radiation gauge system employing the servo motor controlled bridge circuit, described above, has been operated effectively. Such a system is, however, complex and, since it involves a servo mechanism, is subject to wear and somewhat expensive. The recalibration procedure is a complicated one.

It is, therefore, a primary object of the present invention to provide a radiation gauge incorporating a null balancing system without a servo mechanism.

It is another object of the present invention to provide a radiation gauge system in which compensation for decay of the radioactive source may be accomplished rapidly and accurately.

It is still another object of the present invention to provide an efficient, economical, radiation gauge employing a non-servo-mechanical null balancing system which includes an accurate decay compensation feature.

Other objects and advantages will become apparent from the following detailed description when taken in conjunction with the accompanying drawings in which.

Figure 1:
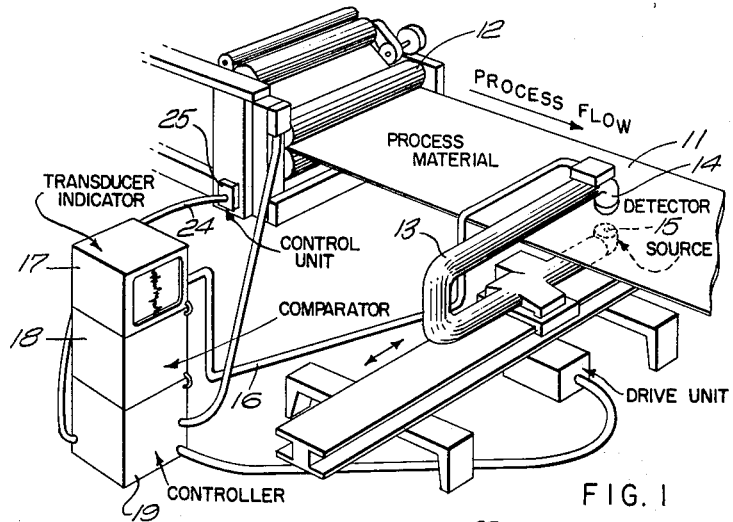
FIG. 1 is a perspective view of a radiation gauge in accordance with the principles of this invention incorporated in a process control system.

With reference now to FIG. 1, process material strip 11 is seen to flow from a processing element 12 through the jaws of transducer 13, which, as shown, may consist of a radiation detector head 14 and a radiation source 15 located beneath the process material. The detector head 14 is electrically connected through cable 16 to transducer signal indicator unit 17, where variations in material mass are visually indicated. The transducer signal is electrically coupled from signal indicator 17 to comparator circuit 18, the output of which is in turn coupled to controller unit 19 which is electrically coupled through cable 24 to control element 25.

In the system illustrated in FIG. 1, the signal provided from the transducer as indicative of the thickness of the process material is a signal directly representative of the amount of radiation received by the radiation detector 14 from the source 15. Initial calibration then requires that a specific radiation detector signal be related to a specific thickness of material and further that, over the expected range of thicknesses of material, the radiation signal varies proportionately to the variation in thickness. As mentioned earlier, some provision must be incorporated in order to compensate for departure from this initial calibration due to decay of the radioactive source.

Figure 2:
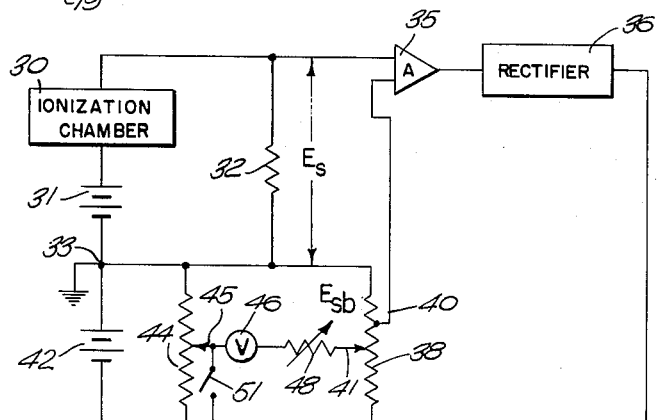
FIG. 2 is an illustration in schematic form of a radiation gauge system embodying the principles of this invention.

Turning now to FIG. 2, there is diagrammatically illustrated a radiation gauge circuit. The radiation detector, which is shown as ionization chamber 30, has a direct current source 31 connected in series between it and a potential reference point 33, which may be ground. A high impedance resistor 32, typically having a value of $10^{10}$ ohms is connected in parallel across the series combination of the ionization chamber 30 and direct current source 31. The junction between the ionization chamber 30 and the resistor 32 is coupled to one input terminal of amplifier 35. Amplifier 35 converts input direct current voltages into alternating current for amplification purposes and provides an alternating current output which is coupled directly to rectifier 36. Rectifier 36 may be any suitable rectifier which converts the alternating current output of amplifier 35 into direct current. A resistor 38 is connected in series between the output of rectifier 36 and the potential reference point 33. A tap 40 from this resistor is connected to the second input of amplifier 35, thus providing that the total input to amplifier 35 consists of the series combination of resistor 32 and the portion of resistor 38 which is between tap 40 and the potential reference point 33. Resistor 38 also has a variable tap 41 connected to it. A second direct current voltage source 42 has one terminal connected to the point of potential reference 33 and the other terminal connected through potentiometer 44 back to the point of potential reference 33. The variable tap 45 of potentiometer 44 is connected to one side of a voltmeter 46. The other side of voltmeter 46 is connected through variable resistor 48 to the tap 41 of resistor 38.

Considering now the operation of the above circuit, the current signal generated in ionization chamber 30 develops a signal voltage $E_S$ across resistor 32. This voltage, plus the voltage $E_{Sb}$ developed between the tap 40 and reference potential point 33, constitute the input voltage for amplifier 35. Amplifier 35 would typically have a gain of about $10^4$ and provides an output from rectifier 36 which is opposite in polarity to the input voltage. The output signal from the rectifier 36 then appears as an output voltage across resistor 38 and this voltage is referred to as $E_T$. A portion of the voltage $E_T$, of course, forms the voltage $E_{Sb}$.

The voltages around this feedback loop then may be expressed by the following equation:

$$(E_S + E_{Sb})A = E_t$$

where A is equal to the amplification factor of amplifier 35.

While a voltmeter reading $E_{Sb}$ could be used to produce a calibration curve of output signal versus material thickness, it is necessary to read this voltage very accurately, and hence, a bridge circuit is used to read the deviation of the amplifier output voltage $E_T$ from a preset point. Since the voltage source 42 is a fixed direct current voltage, then the voltage appearing on the tap 45 of potentiometer 44 represents a fixed reference potential. The difference between this fixed reference potential of tap 45 and the voltage appearing at tap 41 is applied across the series combination of meter 46 and variable resistor 48. The variable resistor 48 provides for adjusting the range of the meter. The voltage V appearing across the meter is then expressed by the following equation:

$$V = E_{wp} - E_{rp} - fE_t$$

where $E_{wp}$ is the reference voltage at tap 45, $E_{rp}$ equals the voltage drop across the variable resistance 48, and $f$ is the fraction of the resistance 38 between the tap 41 and the reference junction 33.

To calibrate the above circuit, the gauge is arranged so that the ionization chamber 30 receives the full amount of radiation with no process material absorption, thus producing a maximum signal $E_s$ across the resistor 32. Switch 51 is closed thereby connecting the meter 46 to the fixed voltage point 49. The tap 41 is positioned on resistor 38 so that zero voltage appears across meter 46. The switch 51 is then opened and tap 45 is then moved along potentiometer 44 until the voltage appearing across meter 46 is zero for desired product thickness. The response to deviations from this value is controlled by adjustment of potentiometer 48.

As the radioactive source decays, the voltage $E_s$ for any given value of absorber thickness will, of course, decrease. On the other hand, the voltage across resistance 44 and hence the voltage at tap 45 will remain constant. To recalibrate after source decay, the procedure is as follows: The ionization chamber is again arranged to receive maximum radiation. The switch is operated to connect the meter to the fixed voltage point 49. The tap 41 is then adjusted so that the meter 46 again reads zero voltage. The switch is then opened to connect the meter to the tap 45.

This recalibration effectively compensates for source decay since the fraction of the output $E_t$ is increased exactly in proportion to the decay of the radioactive source. While the calibration has been described above in terms of the zero absorbing condition, this procedure may be carried out also with a known thickness of material.

Figure 3:
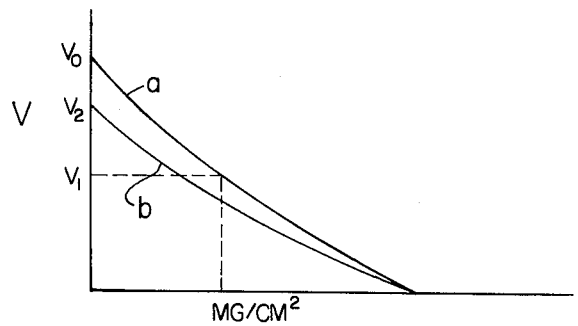
FIG. 3 is a graphical representation of the output signal from the circuit of FIG. 2 as a function of thickness of material for a typical radiation gauge.

In FIG. 3 graphical representation of the voltage V appearing across meter 46 as a function of the weight of material between a typical beta ray source and detector is shown. Referring now to FIG. 3, the voltage $V_0$ is the voltage corresponding to the maximum meter voltage representing zero absorber thickness at the time of initial calibration. Curve $a$ is the response curve of the gauge as a function of thickness of absorbing material with this initial calibration. Voltage $V_1$ is the voltage corresponding to a thickness which is the expected midpoint thickness of the process material, and the circuit is arranged by means, of adjustment of the potentiometer 45 and the variable resistor 48 so that this midpoint corresponds with approximately a center scale reading on meter 46. Curve $b$ of FIG. 3 represents the response curve of the voltage across meter 46 after the radioactive source has decayed and before recalibration. The recalibration has the effect of translating curve $b$ back into complete alignment with curve $a$.

In the above description of the radiation gauge of this invention, reference has been made to voltmeter 46 as the indicating instrument. Any suitable indicator may, however, be substituted. Thus, meter 46 may be an ammeter, a strip chart recorder, or other convenient measuring and indicating means. A beta gauge has been described in the above embodiment, however, the invention may be utilized in any radiation gauge employing a radioisotope, and as a gamma gauge or backscatter gauge.

Having described the invention, various modifications and departures will now occur to those skilled in the art, and the invention described herein should be construed as limited only by the spirit and scope of the attached claims.

What is claimed is:

1. A radiation gauge for measuring and providing an output indication of the thickness of a process material sheet comprising: a radioactive source emitting a beam of radiation incident upon one side of said process material sheet; a radiation detector disposed on the opposite side of said material sheet from said radiation source and providing an output signal current varying in accordance with variations in the quantity of radiation incident upon said detector; a signal resistor coupled across said detector, the voltage developed across said signal resistor being directly proportional to said output signal current; an amplifier having first and second input terminals, said first input terminal being connected to one end of said signal resistor, said amplifier providing as an output a signal having an amplitude directly related to the value of the voltage connected across said first and said second input terminals; a load resistor connected between the output of said amplifier and the other end of said signal resistor, said load resistor having a fixed tap connected to it and a variable tap connected to it, said fixed tap being connected also to said second input terminal of said amplifier thereby providing a serial combination of said signal resistor and a portion of said output resistor across said amplifier input terminals; a voltage source; a potentiometer connected across said voltage source, one end of said potentiometer being connected to the junction between said signal resistor and said load resistor; a voltage measuring and indicating device connected between the variable arm of said potentiometer and the said variable tap of said load resistor, said variable arm being positioned on said potentiometer to produce a predetermined voltage across said voltage measuring means for a predetermined position of said variable tap at a predetermined thickness of said process material sheet.

2. Apparatus in accordance with claim 1 wherein said variable tap is positioned on said load resistor such that for zero thickness of material sheet, the potential of said variable tap is equal to the total voltage across said potentiometer.

References Cited by the Examiner

UNITED STATES PATENTS

| | | | |
|---|---|---|---|
| 2,942,113 | 6/1960 | Handel | 250—83.3 |
| 2,945,130 | 7/1960 | Thompson | 250—83.3 |
| 2,965,847 | 12/1960 | Radley | 250—83.3 |

RALPH G. NILSON, *Primary Examiner.*

JAMES W. LAWRENCE, *Examiner.*